(12) United States Patent
Sulzyc

(10) Patent No.: US 6,367,887 B1
(45) Date of Patent: Apr. 9, 2002

(54) TRAILER BRAKE VALVE

(75) Inventor: Georg Sulzyc, Eppelheim (DE)

(73) Assignee: Haldex Brake Products GmbH, Heidelberg (DE)

( * ) Notice: Subject to any disclaimer, the term of this patent is extended or adjusted under 35 U.S.C. 154(b) by 0 days.

(21) Appl. No.: 09/594,893

(22) Filed: Jun. 15, 2000

(30) Foreign Application Priority Data

Jun. 19, 1999 (DE) .......................................... 199 28 113

(51) Int. Cl.$^7$ ................................................ B60T 13/70
(52) U.S. Cl. ............................. 303/15; 303/22.5; 303/7
(58) Field of Search ......................... 303/3, 15, 7, 22.1, 303/22.5, 28, 35; 188/190

(56) References Cited

U.S. PATENT DOCUMENTS

| | | | | |
|---|---|---|---|---|
| 4,586,754 A | * | 5/1986 | Kitagawa ................... | 303/22 R |
| 4,640,556 A | * | 2/1987 | Fauck et al. ............... | 303/22 R |
| 5,549,362 A | * | 8/1996 | Broome ..................... | 303/3 |
| 6,079,790 A | * | 6/2000 | Broome ..................... | 303/3 |
| 6,126,244 A | * | 10/2000 | Fries ............................. | 303/3 |
| 6,206,481 B1 | * | 3/2001 | Kaisers et al. .............. | 303/7 |

* cited by examiner

Primary Examiner—Christopher P. Schwartz
Assistant Examiner—Xuan Lan Nguyen
(74) Attorney, Agent, or Firm—Thomas, Kayden, Horstemeyer & Risley

(57) ABSTRACT

A trailer brake valve (1) is to be mounted in a compressed air brake system of a trailer of a truck. The brake system of the trailer includes an anti lock control unit and a load sensing control unit. The trailer brake valve (1) includes a housing (2), a relay piston (3) being movably guided in the housing (2) and a control chamber (4). A brake chamber (5) includes connections (31) for conduits leading to brake cylinders (33) of the brake system. The control chamber (4) and the brake chamber (5) are defined by the relay piston (3). A brake conduit (7) is connected to the control chamber (4). A reservoir chamber (47) and an outlet valve (43, 54) are located in the housing (2) and an inlet valve (43, 51) is located adjacent the reservoir chamber (47). A first solenoid valve (8) is arranged in the brake conduit (7) and a second solenoid valve (18) is designed and arranged to deaerate the control chamber (4). A first pressure/voltage converter (16) senses control pressure prevailing in the control conduit (7) and a second pressure/voltage (17) converter senses pressure prevailing in a region adjacent the relay piston (3). A load sensing control unit (26) is designed and arranged to produce a load signal and an independent electronic control (22) unit is designed and arranged to control the first and second solenoid valve (8, 18) exclusively with the load signal produced by the load sensing control unit (26).

11 Claims, 2 Drawing Sheets

TRAILER BRAKE VALVE

CROSS REFERENCE TO RELATED APPLICATIONS

This application claims the benefit of co-pending German Patent Application No. 199 28 113.0 entitled "Anhängerbremsventil far blockiergeschützte Druckluftbremsanlagen von Anhängern" filed on Jun. 19, 1999.

FIELD OF THE INVENTION

The present invention generally relates to a brake valve. More particularly, the present invention relates to a trailer brake valve to be used in a compressed air brake system of a trailer of a truck. The brake system or the brake assembly of the trailer includes an anti lock control unit (ABS control unit) and a load sensing control unit (ALB control unit). The trailer brake valve is a control valve being designed as a relay valve and being arranged at the trailer of the truck. The trailer brake valve serves to control brake pressure in the region of the brake of the trailer of the truck. The trailer itself also includes an anti lock system. Additionally, the trailer includes at least one sensor indicating the load of the trailer and providing a corresponding signal. In case the trailer includes a suspension or a pneumatic cushioning, the sensor may simply sense the pressure in a filling conduit being connected to a suspension bellow.

BACKGROUND OF THE INVENTION

A trailer brake valve is known from German patent No. 35 19 182 C2. The trailer brake valve includes a relay piston being guided in a housing. The relay piston defines a control chamber and a brake chamber in the housing. The brake conduit of the trailer is connected to the control chamber. The brake chamber includes connections for conduits leading to brake cylinders.

The known trailer brake valve includes an inlet valve and an outlet valve including a common double valve body. The inlet valve is located adjacent a reservoir chamber being permanently connected to a reservoir conduit leading to the trailer and to a reservoir at the trailer.

The known trailer brake valve includes an anti lock electronic control unit being integrated into the housing of the trailer brake valve. A pressure/voltage converter detects the control pressure prevailing in the brake conduit, and it is electrically connected to the anti lock electronic control unit to transmit the signal. The known trailer brake valve includes a solenoid valve. The solenoid valve is arranged in the brake conduit leading to the control chamber of the relay piston, and it has a special design.

The known solenoid valve has three possible positions. In the non-excited position of the known solenoid valve, there is a passage in the brake conduit in the direction of the control chamber of the relay piston. In a first excited position of the known solenoid valve, this passage is blocked and a conduit leading to an expansion space is also blocked. In a second excited position of the known solenoid valve, the brake conduit is blocked and the side of the entrance, again, but the connection to the expansion space is freed such that the pressure prevailing in the control chamber is correspondingly reduced. The expansion chamber may be connected to the atmosphere by a throttling bore.

The known trailer brake valve includes a steering mechanism for a load signal. This means that it includes the connection of a mechanical adjustment drive, the position signal of which is fed into the anti lock electronic control device such that the solenoid valve and its inlet, respectively, is closed in steps corresponding to the present load of the trailer. Due to the connection of the control chamber to the expansion space, it is possible to reduce the pressure by one corresponding step. The value of this step depends on the volume of the expansion space.

In many cases, it is not sufficient to reduce the control pressure by one step by a connection of the control chamber to the expansion space. The connection of the expansion space to the atmosphere via a throttling bore has the effect of the pressure being reduced in the expansion space. Nevertheless, the pressure often is not reduced fast enough to remain under the locking limit in the anti lock operating modus.

With the known trailer brake valve, the effect of the load signal (ALB signal) is lost when the power supply of the anti lock electronic control unit (ABS electronic control unit) fails. Thus, the trailer only brakes pneumatically. There is the danger of the trailer braking too much and of the wheels of the trailer locking, respectively.

A brake assembly for pneumatically braking trailers is known from German patent application No. DE 44 25 789 A1. The brake assembly includes an electronic control unit for an anti lock control not only processing anti lock signals (ABS signals), but also additionally processing load signals (ALB signals). When the power supply of the known electronic control unit fails or in case of a different defect occurring in the electronic control unit, the anti lock signal and the load signal do not have an effect any more. In case of such a defect occurring and a brake signal being sent to the trailer by the trailer control valve being located at the truck, the trailer brake pressure is no longer adapted to the driving conditions.

It is also known to use two solenoid valves with prior art relay valves being operated together with an anti lock electronic control unit. The solenoid valves are either located on the truck or on the trailer. The first solenoid valve serves to aerate the control chamber of the relay valve, and the second solenoid valve serves to deaerate the control chamber of the relay valve.

Typically, it is known in the art to use two solenoid valves at one relay valve when an anti lock signal is processed and when the pressure prevailing in the control chamber of the relay valve is to be increased, decreased or kept constant for a limited period of time.

SUMMARY OF THE INVENTION

Briefly described, the present invention provides a trailer brake valve. The trailer brake valve is to be mounted in a compressed air brake system of a trailer of a truck. The brake system of the trailer includes an anti lock control unit and a load sensing control unit. The trailer brake valve includes a housing and a relay piston being movably guided in the housing. A control chamber is located in the housing. A brake chamber is located in the housing, and it includes connections for conduits leading to brake cylinders of the brake system in which the trailer brake valve is to be mounted. The control chamber and the brake chamber are defined and limited by the relay piston. A brake conduit is connected to the control chamber. A reservoir chamber is located in the housing and an inlet valve is located adjacent the reservoir chamber. An outlet valve is located in the housing. A first solenoid valve is arranged in the brake conduit and a second solenoid valve is designed and arranged to deaerate the control chamber. A first pressure/voltage converter is designed and arranged to sense control pressure prevailing in the brake conduit and a second pressure/voltage converter is designed and arranged to sense pressure prevailing in a region adjacent the relay piston. A load sensing control unit is designed and arranged to produce a load signal and an independent electronic control unit is designed and arranged to control the first and second solenoid valve exclusively with the load signal produced by the load sensing control unit.

The present invention is based on the concept to separate the processing of the anti lock signal (ABS signal) from the processing of the load signal (ALN signal) in a compressed air brake assembly of a trailer including an anti lock control unit and a load sensing control unit, and to provide the trailer brake valve with its own electronic control being designed and destined to exclusively process load signals. The trailer brake valve includes two solenoid valves of which the first serves to aerate the control chamber and of which the second serves to deaerate the control chamber. Consequently, a great variety of possible control philosophies are realized for the trailer brake valve.

With the novel brake valve of a trailer of a truck (a "trailer brake valve"), it is possible to safely control the brake pressure of the trailer at least with respect to the value of the load of the trailer (how much mass and weight, respectively, is loaded on the trailer) in case power supply of an anti lock system failing or a in case of a different failure.

The braking processes may be adjusted with respect to the locking conditions. The pressure in front of or behind the relay piston, meaning the pressure in the control chamber or in the brake chamber, is watched and monitored, and it is processed as an influencing variable in the electronic control unit. The trailer brake valve includes its own independent electronic control unit. The anti lock system includes an anti lock electronic control unit.

When such a novel trailer brake valve is used in combination with an anti lock system at a trailer, there is the special advantage of the load sensing function being maintained even when the electric power supply of the anti lock system fails or when a different failure occurs. This means that the load signal never loses its influence on the controlled brake pressure at the trailer brake valve.

There are a number of different possibilities of processing the load signal. The load sensing control unit may include a pressure/voltage transmitter being pneumatically connected to a suspension bellow and being electrically connected to the electronic control unit of the trailer brake valve. In this case, the trailer needs to be supplied with a suspension system or a similar apparatus.

It is sufficient if the first solenoid valve includes two positions, the passage in the brake conduit towards the relay piston being free in the first position and being locked in the second position. Preferably, the second solenoid valve includes its own deaerating opening and two positions, the deaerating opening being locked in the first position and being free in the second position. These two solenoid valves allow for control curves of various designs with corresponding special advantages.

Additionally, it is possible that the electronic control unit of the trailer brake valve includes a connection for an electric line leading to a control valve of a lifting axle. Thus, the lifting axle of the trailer is also controllable by the trailer brake valve. The load signal is directly used for this control. The control valve being located in the electric line may be designed as a 5/2-way valve by which the suspension bellows of the lifting axle and the lifting bellow of the lifting axle are controllable. The 5/2-way valve includes a connection for a compressed air supply, its own deaerating opening and a connection for a pneumatic connecting conduit being connected to the suspension bellows of the other axles.

The electronic control unit of the trailer brake valve may be designed to be freely programmable. In this way, for example, there is the possibility of processing the load signal during normal operating conditions. When the load signal fails, the operating condition may be changed to an emergency condition, for example to a partial load.

There also is the possibility of the trailer brake valve controlling a warning light to indicate a failure of the electronic control unit of the trailer brake valve or different undesired conditions. The warning light is arranged in a way that the driver is capable of visualizing the signal. For example, a different undesired condition is to be understood as a condition in which the trailer is overloaded.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
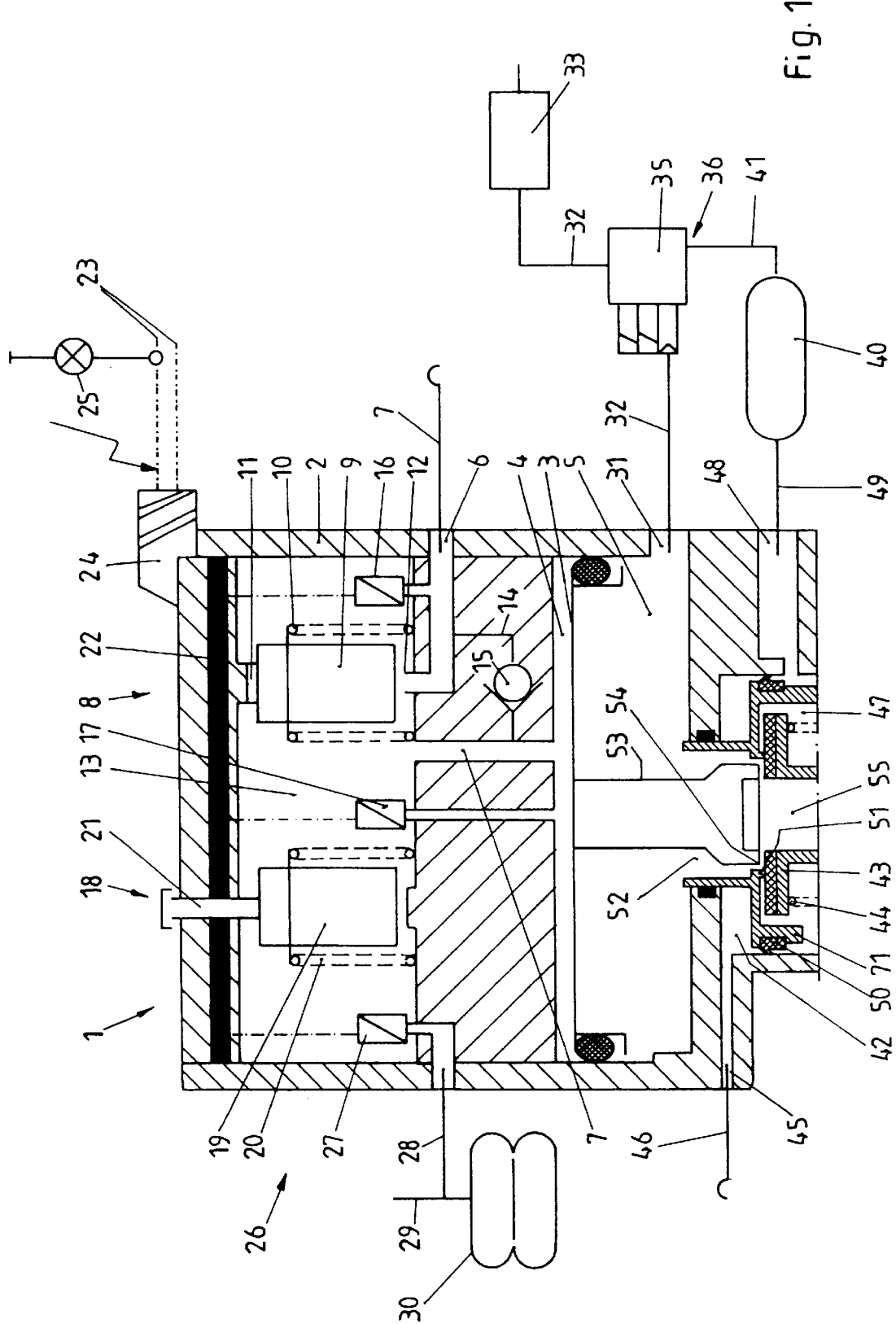
FIG. 1 is a sectional view of a trailer brake valve in its depressurized condition.

Referring now in greater detail to the drawings, FIG. 1 illustrates a vertical sectional view of a trailer brake valve 1 including a housing 2. A relay piston 3 is sealingly and movably guided in the housing 2. The relay piston 3 separates the housing 2 in a way as it defines a control chamber 4 and a brake chamber 5. The housing 2 includes a connection 6 for the brake conduit 7 of the trailer. In this way, the brake conduit 7 is connected to the control chamber 4. A first solenoid valve 8 is arranged in the brake conduit 7, the solenoid valve 8 being arranged in the housing 2 of the trailer brake valve 1, or being connected thereto. The first solenoid valve 8 does not have its own deaerating opening. The first solenoid valve 8 includes a valve magnet 9 being supported on a spring 10 such that the valve magnet 9 engages a stop 11 at the housing 2 in the non-excited position of the valve magnet 9. Consequently, the brake conduit 7 is connected to the control chamber 4, or in other words, there is a passage between the brake conduit 7 and the control chamber 4. It is to be understood from the illustration of FIG. 1 that the first solenoid valve 8 with its valve magnet 9 presses against a passage seat 12 in its excited position. Consequently, the brake conduit 7 is not connected to the control chamber 4, or in other words, there is no passage between the brake conduit 7 and the control chamber 4 in this position of the solenoid valve 8. In the non-excited position of the solenoid valve 8, the brake conduit 7 is connected to a control chamber 13 being located in the housing to of the trailer brake valve 1. The control chamber 13 is permanently connected to the control chamber 4 via a second portion of the brake conduit 7. The two portions of the brake conduit 7 in front of and behind the first solenoid valve 8 are interconnected by a bypass conduit 14 in which a check valve 15 is located as illustrated. In case the first solenoid valve 8 locks the passage, the bypass conduit 14 serves to deaerate the control chamber 4 via the brake conduit 7. A pressure/voltage converter 16 is connected to the brake conduit 7 upstream of the first solenoid valve 8. The pressure/voltage converter 16 serves to sense the pressure prevailing in the brake conduit 7. A second pressure/voltage converter 17 is connected to the portion of the brake conduit 7 being arranged downstream of the first solenoid valve 8, and to the control chamber 4, respectively. The second pressure/voltage converter 17 produces a signal corresponding to the control pressure prevailing in the control chamber 4. Alternatively, the pressure/voltage converter 17 may be connected to the brake chamber 5 to sense the brake pressure prevailing on the other side of the relay piston 3.

A second solenoid valve 18 is arranged in or at the housing 2 of the trailer brake valve 1. The second solenoid valve 18 includes a valve magnet 19 being supported on a spring 20. The second solenoid valve 18 has its own deaerating opening 21; this means it has its own connection to the atmosphere. The second solenoid valve 18 in its non-excited position locks the connection of the control chamber 13 to the atmosphere. The second solenoid valve 18 in its excited position connects the control chamber 13 to the atmosphere via its own deaerating opening 21 such that the control chamber 13 is deaerated or vented.

The trailer brake valve 1 includes an electronic control unit 22 only being schematically illustrated in FIG. 1 The electronic control unit 22 is designed to process and to produce signals of various kinds. The electronic control unit 22 is provided in addition to an anti lock electronic control unit of an anti lock system being arranged at a different position in the brake assembly. The electronic control unit 22 is electrically supplied by electric lines 23 and a plug 24 being arranged at the housing 2 of the trailer brake valve 1. A warning light 25 may be connected to one of the electric lines 23. The warning light 25 is located in the drivers cabin of the truck, and it indicates a failure of the electric supply of the trailer brake valve 1 by lighting up.

A load sensing control unit 26 for producing a load signal is arranged in or at the housing 2. The load sensing control unit 26 includes a pressure/voltage converter 27 being connected to a conduit 29 via a pneumatic conduit 28 leading to a suspension bellow 30. It is to be understood that usually there are two suspension bellows 30 for each carrying axle of the trailer. All pressure/voltage converters 16, 17 and 27 are connected to the electronic control unit 22 via electric lines in a way that they may send electric signals indicating the corresponding sensed pneumatic pressure to the electronic control unit 22. The value of the pressure prevailing in the suspension bellow 30 or in the suspension bellows 30 corresponds to the load of the trailer in a way that the pressure/voltage converter 27 sends a load signal to the electronic control unit 22.

A connection 31 is arranged at the housing 2 of the trailer brake valve 1, the connection 31 being permanently connected to the brake chamber 5. A pneumatic conduit 32 is connected to the connection 31, the conduit 32 leading directly either to one or more brake cylinders 33 of the corresponding carrying axle 34 of the trailer. As illustrated, it is also possible to arrange an anti lock relay valve 35 in the conduit 32, the anti lock relay valve 35 being part of an anti lock system 36. As it is generally known in the art, the anti lock system 36 (FIG. 2) includes an anti lock electronic control unit 37, magnet wheels 38 and a revolution sensor 39. The anti lock relay valve 35 includes its own compressed air supply. For this purpose, a reservoir 40 is connected to the anti lock relay valve 35 via a conduit 41. As illustrated, the anti lock relay valve 35 is controllable both electrically as well as pneumatically. The pneumatic control is realized via the brake chamber 5. The electric control is realized via the anti lock electronic control 37.

A stream in chamber 42 is located below the relay piston 3, the chamber 42 being limited and defined by an emergency brake piston 71. A double valve body 43 being supported on a spring 44 is located below the emergency brake piston 71. The stream in chamber 42 is permanently connected to a reservoir conduit 46 at the trailer via a connection 45. A reservoir chamber 47 is located below the double valve body 43, the reservoir chamber 47 being permanently connected to the reservoir 40 via a connection 48 and a conduit 49. The emergency brake piston 71 includes an overflow element 50 that makes it possible to refill and to enter compresses air into the reservoir 40 via the reservoir conduit 46 at all times.

The double valve body 43 together with a protruding rim 51 of the emergency brake piston 71 forms an inlet valve 43, 51 via which compressed air may stream into the brake chamber 5 via an annular opening 52, and into the brake cylinders 33 via the line 32 in the opened position. The relay piston 3 includes a protrusion 53 having a rim 54 together with the double valve body 43 forming an outlet valve 43, 54. The double valve body 43 is designed to be hollow, and it includes a board 55 being connected to the atmosphere such that the brake chamber 5 is deaerated when the outlet valve 43, 54 is opened.

Figure 2:
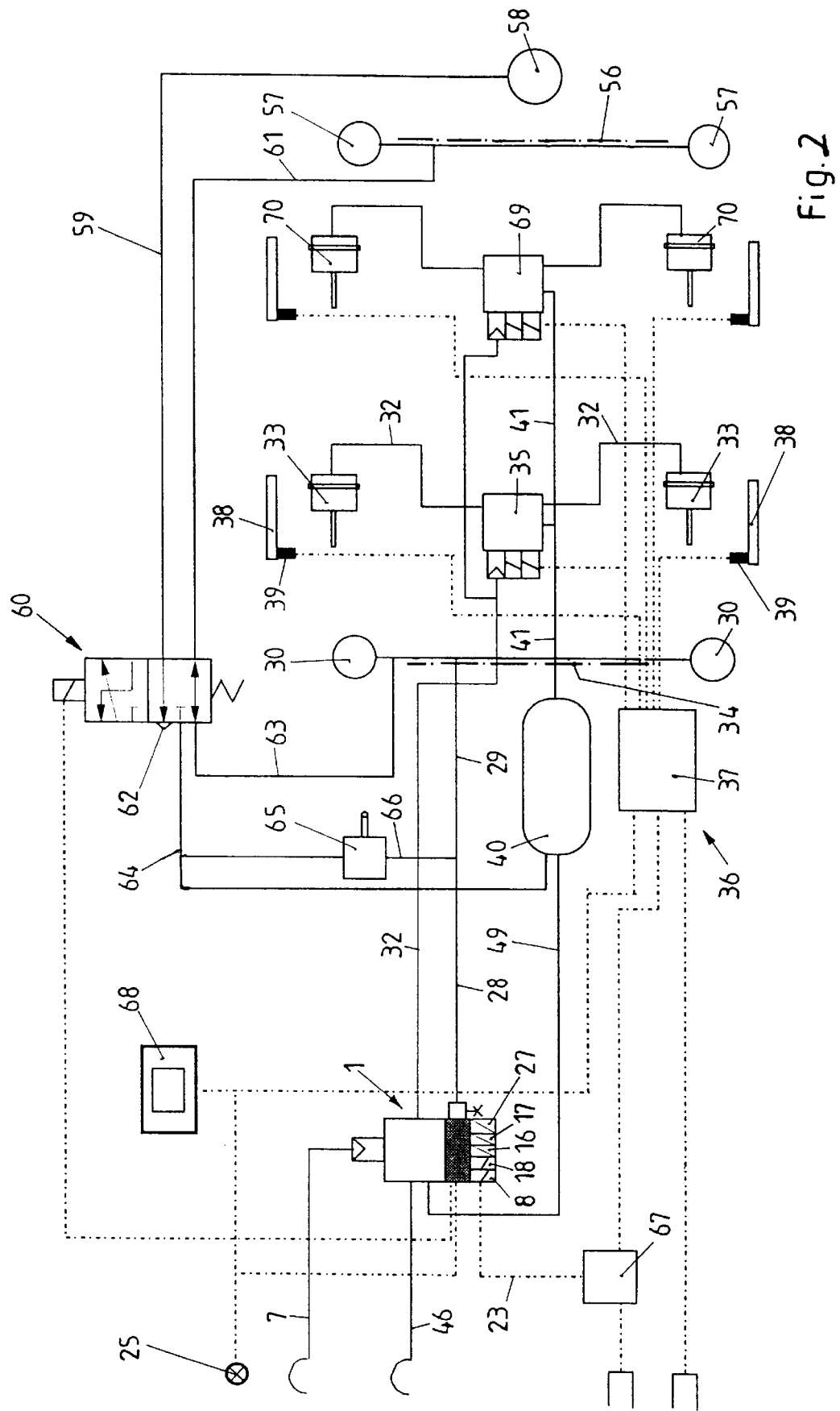
FIG. 2 is a view of a brake system of a trailer including a lifting axle and the trailer brake valve of FIG. 1.

As it is to be seen from FIG. 2, the trailer brake valve 1 is mounted in an assembly of a trailer exemplarily including a carrying axle 34 and a lifting axle 56. The lifting axle 56 includes suspension bellows 57 and a lifting bellow 58. A pneumatic conduit 59 leads to the lifting bellow 58, the pneumatic conduit 59 starting from a control valve 60 which may be designed as a 5/2-way valve. A conduit 61 leads from the control valve 60 to the suspension bellows 57 of the lifting axle 56. Additionally, the control valve 60 includes its own deaerating opening 62, a connection for a connecting conduit 63 leading to the suspension bellows 30 of the carrying axle 34 and a conduit 64 coming from the reservoir 40 for the supply of compressed air. A suspension valve 65 is supplied with compressed air via the line 64, the valve 65 serving as a leveling valve and being connected to the conduits 28 and 29 via a conduit 66. Consequently, the suspension bellows 30 of the carrying axle 34 are supplied with compresses air depending on the load. A corresponding pressure signal prevails at the trailer brake valve 1 and at the pressure/voltage converter 27, respectively, the pressure signal being converted into an electric load signal and being sent to the electronic control unit 22.

The system illustrated in FIG. 2 additionally includes an electric distributing box 67, a diagnosis box 68 and the electric lines being illustrated by dash-dotted lines, while the pneumatic conduits are illustrated by continuous lines.

It is easily imaginable that different from the exemplary embodiment illustrated in FIG. 2, the trailer brake valve 1 may also be used in a system or an assembly only including one or more carrying axles 34, but no lifting axle 56. In this case, the control valve 60, the conduit 63 and the prearranged duplex elements are not necessary. This is also true for a second anti lock relay valve 69 operating the brake cylinders (70) of the lifting axle (56). With respect to the arrangement of the load sensing relay valve (69) of the lifting axle (56), it is referred to the foregoing description of the load sensing relay valve (35).

Operation of the Trailer Brake Valve

The operation of the trailer brake valve (1) starts from the position of its elements as shown in FIG. 1. In this position, the brake conduit (7), the control chamber (4) and the brake chamber (5) are vented. Consequently, the brakes of the trailer are released. When braking action is required by the driver of the tractor, compressed air is being delivered into the brake conduit (7). Since the first solenoid valve (8) is opened, compressed air flows into the control chambers (13 and 4) being interconnected by a part of the brake conduit (7). At that moment, the brake chamber (5) is being vented to the atmosphere since the outlet valve (43, 54) is open. In response to the compressed air being located in the control chamber (4), the relay piston (3) is pressed in a downward direction. The downward movement of the relay piston (3) causes the outlet valve (43, 54) to be closed and the inlet valve (43, 51) to be subsequently opened. Then, compressed air flows from the reservoir (40) into the brake chamber (5). The reservoir (40) is always connected to the reservoir chamber (47). The relay piston (3) is balanced in an end position in which the inlet valve (43, 51) closes, again, while the outlet valve (43, 54) remains closed. In response to a normal braking position or an emergency braking position, the pressure prevailing in the brake chamber (5) has different levels. The respective pressure level prevails in the pneumatic conduit (32) and in the brake cylinders (33) via the antilock relay valve (35).

When braking action is to be ended, the driver of the tractor causes the brake conduit (7) and, consequently, the control chamber (4) to be vented. The pressure prevailing in the brake chamber (5) causes the relay piston (3) to move upwardly and the outlet valve (43, 54) to be opened, while the inlet valve (43, 51) remains closed.

The above described operation of the trailer brake valve (1) is quite normal for any trailer brake valve including a relay piston (3), and it is well known and understood by a person skilled in the art.

The first pressure/voltage converter (16) of the novel trailer brake valve (1) detects the pressure prevailing in the oncoming part of the brake conduit (7), and it transmits a corresponding voltage signal to the electronic control unit (22). The second pressure/voltage converter (17) senses the pressure prevailing in the control chamber (4), and it transmits a corresponding voltage signal to the electronic control unit (22). The third pressure/voltage converter (27) senses the pressure prevailing in the bellows (30), and it transmits a corresponding voltage signal to the electronic control unit (22) in response to different weights resulting from the trailer being loaded with goods.

These three voltage signals are processed in the electronic control unit (22) to control the first solenoid valve (8) and the second solenoid valve (18). In case the level of the pressure is already adapted to the load of the trailer and no correction is required, the first solenoid valve (8) remains opened and the second solenoid valve (18) remains closed during a braking action sent into the brake conduit (7) by the driver.

However, during an emergency braking action made by the driver sending a pressure being too high into the brake conduit (7) not being adapted to the load of the trailer (which may be empty), the electronic control unit (22) causes the first solenoid valve (8) to be closed and the second solenoid valve (18) to be opened. Consequently the high pressure prevailing in the first part of the brake conduit (7) cannot enter the control chamber (4) any more. The solenoid valve (18) opens the outlet to the atmosphere, and thus the pressure prevailing in the control chamber (4) is reduced.

The relay piston (3) always balances the pressure levels between the control chamber (4) and the brake chamber (5). Consequently, the outlet valve (43, 54) is opened, and the brake chamber (5) is vented to a degree which is necessary or which corresponds to the remaining pressure in the control chamber (4).

It is to be noted that the electronic control unit (22) only receives a voltage signal of the load sensing control unit (26) in response to the load of the trailer meaning in response to the pressure prevailing inside the bellows (30). The antilock control unit (37) is not connected to the electronic control unit (22) of the trailer brake valve (1). Consequently, for safety reasons, a failure of the antilock control unit (37) does not impair the proper action of the electronic control unit (22). The braking pressure is modified by the voltage signal of the third pressure/voltage converter (27) in response to different loads of the trailer.

The Many variations and modifications may be made to the preferred embodiments of the invention without departing substantially from the spirit and principles of the invention. All such modifications and variations are intended to be included herein within the scope of the present invention, as defined by the following claims.

I claim:

1. A trailer brake valve (1) to be used in a compressed air brake system of a trailer including an anti lock control unit (37) and a load sensing control unit (26), comprising:

a housing (2);

a relay piston (3) being movably guided in said housing;

a control chamber (4) being located in said housing on one side of said relay piston (3);

a brake chamber (5) being located in said housing on the other side of said relay piston and including connections (31) for pneumatic conduits (32) leading to brake cylinders (33) of a brake system, said control chamber (4) and said brake chamber (5) being defined by said relay piston (3);

a brake conduit (7) being connected to said control chamber (4);

an inlet valve (43, 51) being located adjacent said reservoir chamber (47);

an outlet valve (45, 54) being located in said housing;

a first solenoid valve (8) adapted to control the control pressure prevailing in said brake conduit (7);

a second solenoid valve (18) being designed and arranged to deaerate said control chamber;

a first pressure/voltage converter (16) being designed and arranged to sense control pressure prevailing in said brake conduit (7) for detecting whether and which braking action is required;

a second pressure/voltage converter (17) being designed and arranged to sense control pressure prevailing in a region on one of the sides of said relay piston (3) for detecting whether and which pressure is urging said relay piston (3);

a load sensing control unit (26) being designed to detect the pressure of the bellows (30) and arranged to produce a load signal in response to the loading of the trailer with goods; and an independent electronic control unit (22) being designed and arranged to control said first and second solenoid valve with the load signal produced by said load sensing control unit (26) and not with an antilock signal produced by said antilock control unit (37).

2. The trailer brake valve of claim 1, wherein said load sensing control unit (26) includes a third pressure/voltage converter (27) being designed and arranged to be pneumatically connected to a suspension bellow (30) and to be electrically connected to said electronic control unit (22).

3. The trailer brake valve of claim 1, wherein said first solenoid valve (8) has a first and a second position, the first position allowing for a passage in said brake conduit (7) towards said relay piston (3), and in the second position the passage being locked.

4. The trailer brake valve of claim 1, wherein said second solenoid valve (18) has its own deaerating opening (27) and a first and a second position, said deaerating opening being closed in the first position and being opened in the second position.

5. The trailer brake valve of claim 1, wherein said electronic control unit (22) includes a connecting unit being designed and arranged to be connected to an electric line leading to a control valve (60) of a lifting axle (56).

6. The trailer brake valve of claim 5, wherein the control valve (60) is designed as a 5/2-way valve to control suspension bellows (57) and a lifting bellow (58) of a lifting axle (56).

7. The trailer brake valve of claim 1, wherein said electronic control unit (22) is designed to be freely programmable.

8. The trailer brake valve of claim 5, wherein said electronic control unit (22) is designed to be freely programmable.

9. The trailer brake valve of claim 1, further comprising a warning light (25) to indicate a failure of said electronic control unit.

10. The trailer brake valve of claim 1, wherein said second pressure/voltage converter (17) is designed and arranged to sense pressure prevailing in said control chamber (4).

11. The trailer brake valve of claim 1, wherein said second pressure/voltage converter (17) is designed and arranged to sense pressure prevailing in said brake chamber (5).

* * * * *